United States Patent [19]

Seeger et al.

[11] Patent Number: 5,521,263
[45] Date of Patent: May 28, 1996

[54] CATALYSTS AND SYNTHESIS OF HIGH MOLECULAR WEIGHT AMORPHOUS POLYOLEFINS AND RECOVERY THEREOF

[75] Inventors: Horst K. Seeger; Robert E. Holliday, both of Longview, Tex.

[73] Assignee: Eastman Chemical Company, Kingsport, Tenn.

[21] Appl. No.: 332,306

[22] Filed: Oct. 18, 1994

[51] Int. Cl.$^6$ ........................................................ C08F 2/04
[52] U.S. Cl. ............................... 526/68; 526/69; 526/70; 526/125.3; 526/128; 526/348.2; 526/348.3; 526/348.4; 526/348.5; 526/348.6
[58] Field of Search .............................. 526/68, 69, 70, 526/125.3, 128, 348.2, 348.3, 348.4, 348.5, 348.6

[56] References Cited

U.S. PATENT DOCUMENTS

| | | | |
|---|---|---|---|
| 3,635,755 | 1/1972 | Balinth et al. | 117/122 P |
| 3,951,935 | 4/1976 | Engelmann | 526/129 |
| 3,954,697 | 5/1976 | McConnell et al. | 526/350 |
| 4,218,339 | 8/1980 | Zucchini et al. | 252/429 B |
| 4,710,563 | 12/1987 | Oetting | 528/501 |
| 4,716,206 | 12/1987 | Fujita et al. | 526/139 |
| 4,942,187 | 7/1990 | Kawata et al. | 523/200 |
| 5,112,882 | 5/1992 | Babu et al. | 522/158 |
| 5,130,284 | 7/1992 | Terano et al. | 502/125 |
| 5,328,666 | 7/1994 | Amano et al. | 422/138 |

*Primary Examiner*—David W. Wu
*Attorney, Agent, or Firm*—Mark A. Montgomery; Harry J. Gwinnell

[57] ABSTRACT

A process for the production of amorphous polyolefins is disclosed. The process entails contacting the olefin monomer, in an unreactive hydrocarbon solvent, with a catalyst in a recirculated, stirred reactor thereby producing amorphous polyolefin. The reactor is capable of recirculating contents that are very viscous.

19 Claims, 1 Drawing Sheet

5,521,263

CATALYSTS AND SYNTHESIS OF HIGH MOLECULAR WEIGHT AMORPHOUS POLYOLEFINS AND RECOVERY THEREOF

FIELD OF THE INVENTION

This invention relates to the synthesis of high molecular weight amorphous polyolefins. More particularly the present invention relates to the synthesis of high molecular weight amorphous polyolefins of exceptionally good color and adhesive properties. The present invention also relates to the production of amorphous polyolefins in a solution process containing high amounts of solids.

BACKGROUND OF INVENTION

The synthesis of amorphous polyolefins of low molecular weight, such as polyoctene, with Ziegler-Natta type catalysts is known. However, there are no known commercial processes in existence to produce high molecular weight amorphous polyolefins, particularly polyhexene or polyoctene.

Most publications that disclose classical Ziegler-Natta catalysts based on $TiCl_3$ or 3rd and 4th generation supported Ziegler-Natta catalysts based on $MgCl_2$ supported $TiCl_4$ for the polymerization of α-olefins usually include the disclosure of the polymerization of C2–C10 α-olefins. However, there are no specific disclosures to high molecular weight amorphous polyolefins nor are there disclosures enabling one to produce polyolefins containing a predominant amount of higher α-olefins(C4+) including polyhexene and polyoctene. Additionally, there are no known applications for the higher molecular weight amorphous polyolefins or the higher α-olefin polyolefins such as polyhexene and polyoctene.

It would be very desirable to be able to find applications for high molecular weight amorphous polyolefins and polyolefins of the higher α-olefins. It would also be very desirable to be able to produce high molecular weight amorphous polyolefins including the higher α-olefins that are economical and produce a polyolefin of good color and good properties.

SUMMARY OF INVENTION

The process according to the present invention for the synthesis of amorphous polyolefins comprises contacting a C3–C10 α-olefin, and 0 to 50 weight percent of an unreactive hydrocarbon solvent, such as mineral spirits, in the presence of a catalyst at a temperature of about 25° C. up to the boiling point of the α-olefin in a recirculated, stirred reactor for a time to produce an amorphous polyolefin; wherein said stirred recirculated reactor is agitated such that the reactor contents are well mixed while a portion of the contents of said reactor containing α-olefin, mineral spirits, and amorphous polyolefin are continually removed by the use of a high viscosity pump to recover said amorphous polyolefin; wherein the catalyst is a Ziegler-Natta type catalyst containing tri-alkylaluminum and a titanium halide; and wherein the viscosity of the contents of the reactor are about 100,000 to 500,000 cP.

DETAILED DESCRIPTION OF THE INVENTION

Figure 1:
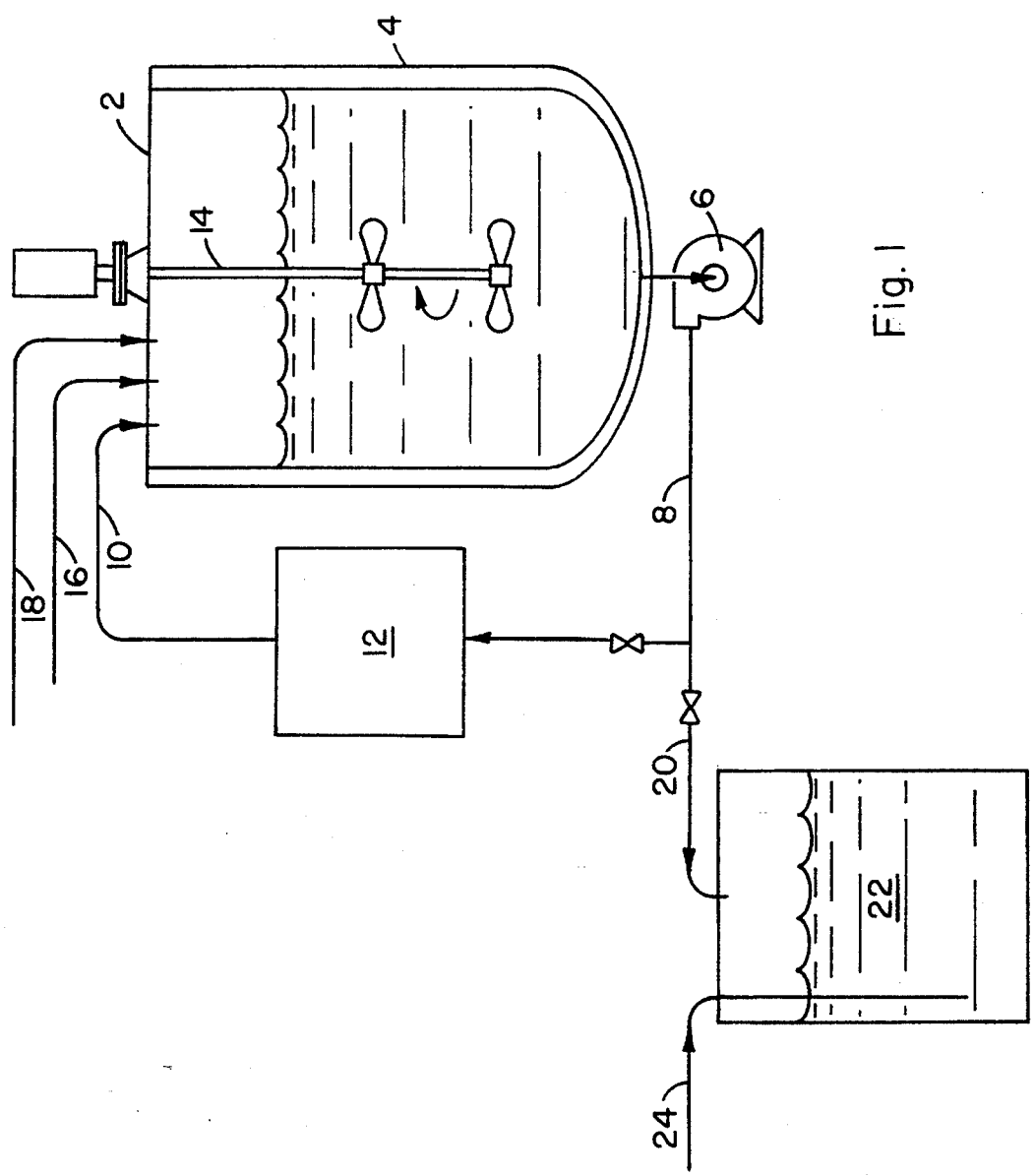
FIG. 1 This drawing illustrates a preferred process of polymerizing the amorphous polyolefin in a stirred reactor containing a viscous solution. Monomer and catalyst are introduced into the reactor and product is continually removed with a partial recycle to the reactor.

Applicants have unexpectedly discovered a process for the production of high molecular weight amorphous polyolefins and a process for the production of amorphous polyolefins in a solution process containing a high amount of solids. The applicants have also unexpectedly discovered an improved process and catalyst system for the production of high molecular weight higher α-olefin polymers of exceptionally good color and adhesive properties.

The process for the synthesis of amorphous polyolefins according to the present invention comprises contacting a $C_3$–$C_{10}$ α-olefin, and 0 to 50 weight percent of an unreactive hydrocarbon solvent in the presence of a catalyst at a temperature of about 25° C. up to the boiling point of the α-olefin in a recirculated, stirred reactor for a time to produce an amorphous polyolefin; wherein said recirculated, stirred reactor is agitated such that the reactor contents are well mixed while a portion of the contents of said reactor containing α-olefin, solvent, and amorphous polyolefin are continually removed by the use of a high viscosity pump to recover said amorphous polyolefin; wherein the catalyst is a Ziegler-Natta type catalyst containing a titanium halide and a cocatalyst selected from the group consisting of tri-alkylaluminum and di-alkylaluminum halide; and wherein the viscosity of the contents of the reactor are about 100,000 to 500,000 cP.

The process according to the present invention the $C_3$–$C_{10}$ α-olefin is preferably a $C_4$–$C_{10}$ α-olefin, more preferably hexene or octene. In the process according to the present invention the $C_3$–$C_{10}$ α-olefin can be contacted with up to 10 wt. % of an additional α-olefin.

In the process according to the present invention the unreactive hydrocarbon solvent is preferably mineral spirits.

In the process according to the present invention the catalyst is a Ziegler-Natta catalyst based on a titanium chloride more preferably a Ziegler-Natta catalysts based on $TiCl_3$ and Ziegler-Natta catalysts based on $MgCl_2$ supported $TiCl_4$.

In the process according to the present invention the temperature is about 50° C. to 100° C. and th contacting for the majority of the contents of said reactor is for a time of about 0.5 to 10 hours more preferably about 3 to 5 hours.

In the process according to the present invention a portion of said contents of said recirculated, stirred reactor is preferably recirculated by being continually pumped out of said reactor at one point and pumped into said reactor at another point, more preferably said contents of said reactor are recirculated such that 10 to 100 percent of the volume of said reactor is recirculated over a period of time of about 5 minutes to 2 hours. Additionally a portion of the contents of said reactor can be continually removed by taking a slip stream off the contents being recirculated. The process according to the present invention a portion of said contents can be recirculated by said high viscosity pump out of the bottom of said reactor into the top of said reactor, such as by a gear pump.

The process according to the present invention said reactor is agitated by the use of a rotating stirrer having a central rotating shaft with paddles attached perpendicular to said shaft.

In the process according to the present invention said $C_3$–$C_{10}$ α-olefin, is most preferably octene present in mineral spirits in a concentration of about 20 to 60 weight percent with about 0.009 to 0.02 weight percent catalyst.

The composition according to the present invention comprises a high molecular weight polyoctene having an inherent viscosity of at least 2, determined in toluene at 25° C. using ASTM procedure, more preferably a polyoctene having an inherent viscosity of at least 2.5 and a gardner color of 1 to 3.

The batch solution process, run continuously (see FIG. 1), for producing polyoctene according to the present invention is preferably conducted under the following conditions; a temperature of 50° to 100° C., atmospheric pressure, a residence time of 3 to 5 hours, a conversion of 65 to 85%, an octene concentration of 20 to 60% in mineral spirits, 0.7 to 1.58 grams of solid catalyst (in a 3 gallon reaction mixture of mineral spirits and octene), an organo aluminum/Ti ratio of 5/1 to 20/1, and a molar ratio of organo aluminum/silicon compound of 5/1 to 20/1.

The high molecular weight polyoctene produced according to this invention, after catalyst deactivation and stabilization, exhibits a unique combination of excellent color, aggressive tack, and excellent strength which is desirable for high performance adhesive applications. The high molecular weight (2.6 I.V.) polyoctene, because of its combination of good color, aggressive tack, and excellent strength has created interest in a variety of high performance adhesive and sealant applications, such as, disposable product adhesives (diapers and feminine products), hot melt pressure sensitive adhesives for labels, product assembly adhesive for polyolefin plastics and wood, carpet tile adhesives, medical adhesives, automotive adhesives, and carpet seaming tape adhesives.

A preferred process of producing the amorphous polyolefin of the present invention is illustrated in FIG. 1. The reactor 2 is jacked with a heat exchanging means 4 to maintain the appropriate temperature of polymerization inside the reactor 2. Unreacted olefin monomer and any solvent, such as mineral spirits, enters the reactor via line 18. Catalyst in a flowable slurry enters the reactor via line 16. The reactor 2 is equipped with agitation means or stirring means 14 and recirculating means 6 to maintain a thorough mixing of reactants and amorphous polyolefin product. Amorphous polyolefin product and unreacted reactants exit the bottom of the stirred reactor 2 and are pumped into line 8 by the use of a high viscosity pump 6, such as a gear pump. The material containing product and unreacted reactants is taken from the reaction system via line 20. A portion of the material is continually recycled to a heat exchanger 12 and back into reactor 2 through line 10. The product and unreacted reactants in line 20 can be stored in a container or tank 22 for later recovery of the product.

An optional process of recovering product entails the introduction of wet air and antioxidant via line 24 to kill and deactivate the catalyst. Reactants and any solvent or diluent are removed by vacuum stripping.

An alternate preferred process for recovering the product and deactivating the catalyst entails introducing antioxidant and acid scavenger via line 24 into the tank and mixing with the material using a circulating pump (not shown). This material is then introduced into a screw extruder (not shown) and the majority of the volatile materials are removed by vacuum, purified, and recycled back to the reactor 2 via line 18. After thorough mixing and back mixing such as in a twin screw extruder with a reverse element between two blisters an additional vacuum is pulled (not shown). This vacuum removes the remainder of the unreacted monomer and volatile material and the catalyst deactivation products that were generated by the introduction of air and water (both introduced at a point behind the second vacuum port, not shown). The product then exits the extruder and generally contains about 99.5 weight percent solids.

The preferred novel catalyst system for the production of a polyolefin of $C_4$–$C_{10}$ comprises;

(A) a solid catalyst component prepared by (a) reacting in an organic solvent a suspended magnesium compound with titanium tetrachloride in the presence of an organic acid chloride to form a solid substance containing an internal strong electron donor formed in situ, wherein said magnesium compound is of the formula $$MgQ_{2-n}X_n$$

wherein each Q is independently selected from an alkoxide, aryloxide, or carboxylate group, X is a halogen and n= 0 or 1, (b) decanting then washing said solid substance with an organic solvent that does not dissolve said solid substance, (c) contacting said solid substance suspended in an organic solvent, with titanium tetrachloride, and (d) decanting then washing said solid substance with an organic solvent that does not dissolve said solid substance;

(B) a silicon compound of the general formula;

$$SiR_m(OR')_{4-m}$$

wherein R is selected from an alkyl group, a cycloalkyl group, an aryl group and vinyl group, R' is an alkyl group and m is zero or an integer of 1–3, with the proviso that when m is 2 or 3, plural R groups may be identical or different, or that when m is zero, 1, or 2 plural R' groups may be identical or different and/or that when R is an alkyl group, R' may be identical with or different from R; and (C) an organoaluminum compound of the general formula;

$$R_n''AlX_{3-n}$$

wherein R" is an alkyl group, X is a halogen or hydrogen atom and n is an integer of 1–3, with the provision that when n is 2 or 3, plural R" groups may be identical or different.

The magnesium compound used in producing the solid catalyst component of (A) is preferably suspended in the organic solvent prior to being reacted in step (a). The suspending of the magnesium compound prior to contacting the organic acid chloride and the titanium tetrachloride ensures a more complete reaction. The amount of magnesium compound suspended in the organic solvent is preferably about 2 to 20 wt. %, more preferably about 5 to 15 wt. % with a wt. % of about 10 being most preferred.

The organic solvent can be any organic solvent that does not dissolve magnesium chloride. Suitable organic solvents include aromatic or aliphatic organic solvents, and aromatic or aliphatic halohydrocarbon solvents, preferably an aromatic solvent or an aromatic halohydrocarbon solvent. Examples of suitable specific solvents include benzene, chlorobenzene, and toluene with toluene being most preferred.

Preferred magnesium compounds within the formula above are selected from the group consisting of alkoxy and arylalkoxy magnesium halides; magnesium dialkoxides; magnesium diaryloxides; magnesium alkoxide carboxylates; magnesium aryloxide carboxylates; and magnesium alkoxide aryloxides. Specific examples of suitable magnesium compounds are isobutoxy magnesium chloride, ethoxy magnesium bromide, phenoxy magnesium iodide, cumyloxy magnesium bromide, naphthenoxy magnesium chloride, magnesium di-isopropoxide, magnesium diethoxide, magnesium dibutoxide, magnesium diphenoxide, magnesium dinaphthenoxide, ethoxy magnesium isobutoxide, magnesium dioctanoate, magnesium dipropionate, ethoxy magnesium phenoxide, napthenoxide magnesium isoamyloxide, ethoxy magnesium octanoate, phenoxy magnesium propionate, and chloromagnesium dodecanoate with magnesium diethoxyide being most preferred due to availability and cost. When the strong electron donor of (a) is prepared from an organic acid chloride precursor during the reaction in (a), as will be discussed hereafter, the magnesium compound should have at least one OR group and is preferably magnesium alkoxide or an alkoxy magnesium halide.

The internal strong electron donor of (a) is preferably an ester and is prepared in situ from the corresponding organic acid chloride. The internal strong electron donor is prepared in situ by reacting the organic acid chloride precursor with a magnesium compound such as a magnesium alkoxide. Preferred organic acid chloride precursors used in preparing the internal strong electron donor of (a) are selected from benzoyl chloride and phthaloyl dichloride that are reacted with diethoxy magnesium to form the most preferred internal strong electron donors of ethyl benzoate, and diethyl phthalate.

The term strong electron donor, when used herein, means the compound is a Lewis Base and has a strong electron donating ability so as to complex strongly with active catalyst sites that accept electrons, such as titanium trichloride.

In the catalyst system prepared and used according to the present invention the internal strong electron donor in the solid catalyst component of (A) is present during the reaction in the form of an organic acid chloride precursor in (a) in an amount of 0.1 to 2 moles per mole of magnesium compound, more preferably about 0.2 to 0.4 moles per mole of magnesium compound.

During the preparation of the solid catalyst component (A) the titanium tetrachloride is preferably present in (a) in an amount of about 2 to 6 moles per moles of magnesium compound, with about 3 to 4 moles per mole of magnesium compound being more preferred. Amounts of much over 6 moles of titanium tetrachloride per mole of magnesium compound (a) is more than an amount needed to be effective in producing magnesium chloride, whereas amounts much less than about 2 moles of titanium tetrachloride per mole of magnesium would require more titanium tetrachloride in step (c) or many repeats of (c).

The solid substance prepared in (a) needs to be removed from the solvent by decanting and then washed to remove unreacted components. The washing is conducted with an organic solvent that does not dissolve the solid substance. Suitable examples of such organic solvents include those in (a) above. This washing step of (b) can be repeated as many times as required to remove a sufficient amount of byproducts, contaminants or unreacted components.

The solid substance that has been prepared, washed and decanted is again suspended in organic solvent and treated at least one more time with titanium tetrachloride. This treatment can be conducted once or several times so long as a sufficient amount of the magnesium compound is converted to magnesium chloride and a sufficient amount of titanium tetrachloride is deposited on the surface of the magnesium chloride in the solid substance. After each treatment with titanium tetrachloride or after the final treatment, the solid substance is again decanted and washed with the organic solvent. Each washing can be conducted as many times as needed to remove unwanted substances but is preferably conducted at least three times. The titanium tetrachloride treating step (c) is preferably repeated at least a second time after the washing step (d) and then washed again.

The titanium tetrachloride in initial or subsequent contacting steps is at a concentration in a hundred milliliters of organic solvent of about 200 to 600 millimoles (mmoles) and in a molar ratio of about 2 to 6 moles per mole of magnesium, more preferably about 400 to 500 mmoles in a molar ratio of about 4 to 5 moles per mole of magnesium compound.

The preparation of the solid catalyst component (A) is preferably conducted under agitation at a temperature of about 80° to 125° C. for about 30 minutes to 8 hours with a temperature of about 100° to 110° C. at a time of about 2 to 3 hours being most preferred. At temperatures much below 80° C. the preparation of the solid catalyst component commences to be relatively slow whereas temperatures much above 125° C. commences to evaporate the solvent at atmospheric pressure. Times much less than 30 minutes are probably not sufficient to complete the reactions whereas times much over 8 hours are not needed.

The catalyst system according to the present invention requires the presence of a silicon compound of the formula described above. Examples of suitable silicon compound groups include tetraalkoxysilanes, alkylalkoxysilanes, phenylalkoxysilanes, phenylalkylalkoxysilanes, cycloalkylalkoxysilanes, cycloalkylalkylalkoxysilanes, cycloalkylphenylalkoxysilanes, and cycloalkylalkylphenylalkoxysilanes. Examples of specific silicon compounds include tetramethoxysilane, tetraethoxysilane, tetrapropoxysilane and tetrabutoxysilane, trimethoxyethylsilane, trimethoxymethylsilane, dimethyldimethoxysllane, triethylmethoxysilane, trimethylmethoxysllane, diethyldiethoxysilane, diisobutyldimethoxysilane, propyltrimethoxysilane, ethyltrimethoxysilane, ethyltrisopropoxysilane, phenyltrimethoxysilane, phenyltriethoxysilane, phenyltripropoxysilane, phenyltriisopropoxysilane, diphenyldimethoxysilane, diphenyldiethoxysilane, triphenylmethoxysilane, cyclohexyltriethoxysilane, cyclohexylmethyldimethoxysilane, dicyclopentyldimethoxysilane, tricyclohexylethoxysilane, phenyl(methyl)dimethoxysilane, cyclohexyl(ethyl)phenylmethoxysilane, dicyclohexyldiethoxysilane, vinyltrimethoxysilane, vinyl(dimethyl)methoxysilane, and vinyl(cyclohexyl)methyl methoxysilane with cyclohexylmethyldimethoxysilane and phenyltriethoxysilane being most preferred.

The amount of silicon compound (B) in the catalyst system of the present invention is in an amount to yield an organoaluminum compound to silicon compound molar ratio of about 1 to 100, preferably 5 to 30 with an organoaluminum compound/silicon compound molar ratio of about 10 to 20 being most preferred. Organoaluminum compound/silicon compound molar ratios much below about 1 cause low catalyst activity whereas molar ratios much above 100 produce polyoctene with an undesirable low molecular weight.

The organoaluminum compound (C) is preferably selected from the group consisting of trialkylaluminums, dialkylaluminum halides, and dialkylaluminum hydrides. The preferred organoaluminum compound is selected from the group consisting of trimethylaluminum, triethylaluminum, triisobutylaluminum, and diisobutylaluminum hydride with triethylaluminum (TEAL) being most preferred due to availability and cost.

The organoaluminum compound is preferably present in an amount to yield a molar ratio of organoaluminum compound/titanium of about 1 to 50, preferably about 5 to 20, with an organoaluminum compound titanium molar ratio of about 10 to 15 being most preferred. A molar ratio of organoaluminum compound/titanium much below 1 results in a catalyst system with very poor catalyst activity whereas a molar ratio much above 50 produces polyoctene with undesirable low molecular weight.

The following examples are intended to illustrate the present invention but are not intended to limit the reasonable scope thereof.

EXAMPLES

Solution Process

In the following examples, a small scale laboratory unit consisting of a 3-gallon jacketed glass reactor, heat exchanger and LCI 22/13 circulation pump (a high viscosity solution pump) was used to carry out the octene polymerizations essentially as shown in FIG. 1. In a typical polymerization run the 3-gallon glass reactor was charged with about 1 gallon of a 50/50 octene/mineral spirits feed mixture under nitrogen and heated to about 50° C. by circulating it through the heat exchanger at 200 RPM (0.2 gal. per min.). Catalyst was then charged to the reactor as specifically stated in the examples. Usually the temperature started rising and bubbles started forming after the catalyst addition. As soon as the temperature reached about 60° C., additional feed was added to maintain a temperature between 60° C. and 65° C. until the reactor was full (3 gallons or 8,000 grams of solution). This operation usually took about 20 to 30 minutes. The polymerization was conducted for an additional 3 hours at a controlled temperature of 65° C. plus or minus 2° C. Heating or cooling of the reactor medium was achieved by circulating hot or cold water through the reactor jacket; by circulating cold water through the heat exchanger; or by heating the heat exchanger with electrical heating tape. After 3.25 to 3.5 hours polymerization time the weight percent solids in the reaction medium usually reached about 30 to 33 weight percent. At that time the polymer solution, still containing active catalyst, was discharged into a five gallon bucket where the polymer was catalyst deactivated by bubbling wet air through the solution and stabilized by adding 6.5 grams Irganox 1010 (0.25 weight percent antioxidant based on solid polymer) to the solution under stirring for 30 minutes. About 10 ml of the polymer solution was vacuum stripped for 30 minutes at 230° C. in a test tube. The final products (polyoctene) were analyzed for inherent viscosity in toluene at 25° C.

CLASSICAL ZIEGLER-NATTA CATALYST

Classical Ziegler-Natta catalyst used in the less preferred examples was Lynx 900, a preactivated $TiCl_3$ catalyst.

The $TiCl_3$ used to prepare the preactivated $TiCl_3$ was chemically reduced $TiCl_3$. The $TiCl_3$ was preactivated by prepolymerizing propylene in the presence of the $TiCl_3$ to a level of about 50 weight percent polypropylene and about 50 weight percent $TiCl_3$. The commercially available preactivated catalyst used in the less preferred examples was Lynx 900 (prepared from chemically reduced $TiCl_3$), available from Catalyst Resources, Inc., Houston, Tex.

SUPPORTED CATALYST

The supported catalyst used in the less preferred examples contain $TiCl_4$ supported on magnesium $MgCl_2$ by ball milling. The amount of $TiCl_4$ on the $MgCl_2$ support is about 10 weight percent and contains about 20 weight percent of an organic ester (p-ethoxyethylbenzoate). A commercially available supported catalyst used in these less preferred examples was Lynx 705, available from Catalyst Resources, Inc., Houston, Tex. Such catalyst are often also referred to as third generation catalyst.

Examples 1–10 (less preferred)

The small scale laboratory unit was used to evaluate two commercial Ziegler-Natta catalysts for the polymerization of octene. The process was conducted essentially as stated in the solution process above except that the monomer content, temperature, catalyst, and catalyst molar ratios were varied in an effort to produce 2.6 I.V. polyoctene. The conditions and results are illustrated below in Table I.

TABLE I

|  | Example 1 | Example 2 | Example 3 | Example 4 | Example 5 |
| --- | --- | --- | --- | --- | --- |
| REACTION CONDITIONS: |  |  |  |  |  |
| Min. spirits/Octene Charge, Gal | 3.0 | 3.0 | 3.0 | 3.0 | 3.0 |
| Octene Concentration, WT % | 20 | 30 | 40 | 50 | 50 |
| Catalyst Type | LYNX 705 | LYNX 705 | LYNX 705 | LYNX 705 | LYNX 705 |
| Solid Catalyst Charge, G | 1.0 | 1.0 | 1.0 | 1.0 | 1.0 |
| Ti content in Catalyst, Wt % | 1.87 | 1.87 | 1.87 | 1.87 | 1.89 |
| ALET3/Ti Mole Ratio | 75 | 75 | 75 | 75 | 50 |
| ALET3/CHMDS Mole Ratio | — | — | — | — | — |
| Reaction Temp., °C. | 60 ± 2 | 60 ± 2 | 60 ± 2 | 60 ± 2 | 60 ± 2 |
| Residence Time, Hrs. | 3.5 | 3.5 | 3.5 | 3.5 | 3.5 |
| RESPONSES: |  |  |  |  |  |
| Solids, Wt % | 14.4 | 16.8 | 28.6 | 32.0 | 26.2 |
| Conversion, % | 72 | 56 | 71.5 | 64 | 52 |
| Catalyst Productivity, G/G | 1,152 | 1,344 | 2,288 | 2,560 | 2,096 |
| Polymer I.V. | 1.63 | 1.69 | 1.71 | 1.73 | 1.85 |
| Polymer Color | Slightly Yellow | White | White | White | White |
|  | Example 6 | Example 7 | Example 8 | Example 9 | Example 10 |
| REACTION CONDITIONS: |  |  |  |  |  |

TABLE I-continued

| | | | | | |
|---|---|---|---|---|---|
| Min. spirits/Octene Charge, Gal | 3.0 | 3.0 | 3.0 | 3.0 | 3.0 |
| Octene Concentration, WT % | 50 | 50 | 50 | 50 | 50 |
| Catalyst Type | LYNX 705 | LYNX 705 | LYNX 705 | LYNX 900 | LYNX 900 |
| Solid Catalyst Charge, G | 1.0 | 1.5 | 1.5 | 2.7 | 2.7 |
| Ti content in Catalyst, Wt % | 1.87 | 1.87 | 1.87 | 15.5 | 15.5 |
| ALET3/Ti Mole Ratio | 25 | 75 | 75 | 1.0 | 1.0 |
| ALET3/CHMDS Mole Ratio | — | 20 | 10 | — | — |
| Reaction Temp., °C. | 60 ± 2 | 60 ± 2 | 60 ± 2 | 60 ± 2 | 80 ± 2 |
| Residence Time, Hrs. | 3.5 | 3.5 | 3.5 | 3.5 | 3.5 |
| RESPONSES: | | | | | |
| Solids, Wt % | 15.5 | 24.0 | 21.0 | 26.4 | 27.5 |
| Conversion, % | 31 | 48 | 42 | 53 | 55 |
| Catalyst Productivity, G/G | 1,240 | 1,280 | 1,120 | 782 | 815 |
| Polymer I.V. | 1.89 | 2.03 | 1.97 | 3.78 | 2.51 |
| Polymer Color | Slighly Yellow | Slighly Yellow | Slighly Yellow | Dark Yellow | Dark Yellow |

The results showed that the monomer content in the feed had a significant effect on the Lynx 705 catalyst productivity. Increasing the monomer content from 20 to 50% increased the catalyst productivity from 1,150 to 2,560 grams polyoctene/gram catalyst (see examples 1–4). The evaluated Lynx 705 catalyst at an AlEt$_3$/Ti mole ratio of 75/1 and a low temperature of 60° C. produced polyoctene of lower than the preferred molecular weight (1.7 I.V.) but at very good catalyst productivity (2,600 grams polyoctene/gram catalyst) and exhibited very good color (white) after catalyst deactivation. Decreasing the AlEt$_3$/Ti catalyst mole ratio from 75/1 to 25/1 or adding cyclohexyl methyl dimethoxysilane(CHMDS) at AlEt$_3$/CHMDS mole ratios of 20/1 and 10/1 to the catalyst had a very detrimental effect on catalyst productivity decreasing it from 2,600 to 1,200 grams/grams but increased the polymer I.V. only from 1.7 to 2.0 which was below the target I.V. of 2.5 to 2.6 (see Examples 5–8).

The evaluation of the Lynx 900 catalyst revealed that this catalyst at an AlEt$_3$/Ti mole ratio of 1/1 produced polyoctene of the most preferred high molecular weight (2.5 I.V.) at 80° C. but at poor catalyst productivity (800 grams polyoctene/gram catalyst) and exhibited poor color (dark yellow) after catalyst deactivation. Even higher molecular weight polyoctene (I.V. of 3.7) was produced with this catalysts at the lower temperature of 60° C. (see examples 9 and 10). In conclusion, neither of these catalysts in examples 1–10 achieved the goal of producing the most preferred molecular weight of 2.5 to 2.6 I.V. polyoctene also having good color at high catalyst productivity.

EXAMPLES 11–18

The small laboratory scale unit was used to evaluate the preferred fourth generation catalyst of the present invention. The process was conducted essentially gas stated in the solution process above except that a fourth generation catalyst composed of TiCl$_4$ supported on MgCl$_2$ (2.5 weight % titanium) and an internal electron donor of (phthalic acid ester), was used and that the catalyst molar ratio and temperature was varied in an effort to produce 2.5 to 2.6 I.V. polyoctene. The conditions and results are illustrated below in Table II.

TABLE II

| | Example 11 | Example 12 | Example 13 | Example 14 | Example 15 | Example 16 | Example 17 | Example 18 |
|---|---|---|---|---|---|---|---|---|
| REACTION CONDITIONS: | | | | | | | | |
| Min. spirits/Octene Charge, Gal | 3.0 | 3.0 | 3.0 | 3.0 | 3.0 | 3.0 | 3.0 | 3.0 |
| Octene Concentration, WT % | 50 | 50 | 50 | 50 | 50 | 50 | 50 | 50 |
| Catalyst Type | Catalyst of Invention | Catalyst of Invention | Catalyst of Invention | Catalyst of Invention | Catalyst of Invention | Catalyst of Invention | Catalyst of Invention | Catalyst of Invention |
| Solid Catalyst Charge, G | 1.0 | 1.0 | 1.0 | 1.0 | 1.0 | 1.0 | 1.0 | 1.0 |
| Ti content in Catalyst, Wt % | 2.58 | 2.58 | 2.58 | 2.58 | 2.58 | 2.58 | 2.58 | 2.58 |
| ALET3/Ti Mole Ratio | 125 | 125 | 20 | 15 | 10 | 15 | 15 | 15 |
| ALET3/CHMDS Mole Ratio | 25/1 | 5/1 | — | — | — | — | 20 | 10 |
| Reaction Temp., °C. | 60 | 60 | 60 | 60 | 60 | 65 | 70 | 75 |
| Residence Time, Hrs. | 3.5 | 3.5 | 3.5 | 3.5 | 3.5 | 3.5 | 3.5 | 3.5 |
| RESPONSES: | | | | | | | | |
| Solids, Wt % | 45.2 | 41.6 | 39.5 | 37.1 | 35.4 | 37.0 | 36.0 | 35.5 |
| Conversion, % | 90 | 83 | 79 | 74 | 71 | 74 | 72 | 71 |
| Catalyst Productivity, G/G | 3,620 | 3,330 | 3,160 | 2,970 | 2,880 | 2,960 | 2,880 | 2,840 |
| Polymer I.V. | 1.57 | 1.68 | 2.25 | 2.75 | 3.20 | 2.6 | 2.75 | 2.58 |
| Polymer Color | White | White | White | White | White | White | White | White |

Fourth generation catalysts like the catalyst of this invention are normally used at Al/Ti mole ratios of 100–150/1 and at Al/CHMDS mole ratios 5–25/1 for the synthesis of isotactic polypropylene at a temperature of 65°–70° C. Under such conditions very low I.V. (1.57–1.68) polyoctene was produced (see examples 11 and 12). It was unexpected to find that the desired high I.V. polyoctene with good color could be produced at very good catalyst productivity, when the Al/Ti mole ratio was reduced to from 125/1 to 20/1. Additional fine tuning of the catalyst mole ratios gave three options for producing the desired 2.6 I.V. polyoctene with good color and high catalyst productivity as shown below in Table III.

TABLE III

|  | Temp, °C. | Al/Ti Mole Mole Ratio | Al/CHMDS Mole Ratio |
|---|---|---|---|
| Option 1 | 65 | 15/1 | — |
| Option 2 | 70° C. | 15/1 | 20/1 |
| Option 3 | 75° C. | 15/1 | 10/1 |

See Examples 13–18 for results.

We claim:

1. A process for the synthesis of amorphous polyolefins comprising contacting a $C_3$–$C_{10}$ α-olefin, and 0 to 50 weight percent of an unreactive hydrocarbon solvent in the presence of a catalyst at a temperature of about 25° C. up to the boiling point of the α-olefin in a recirculated, stirred reactor for a time to produce an amorphous polyolefin; wherein said recirculated, stirred reactor is agitated such that the reactor contents are well mixed while a portion of the contents of said reactor containing α-olefin, solvent, and amorphous polyolefin are continually removed by the use of a high viscosity pump to recover said amorphous polyolefin; wherein the catalyst is a Ziegler-Natta type catalyst containing a titanium halide and a cocatalyst selected from the group consisting of tri-alkylaluminum and di-alkylaluminum halide; and wherein the viscosity of the contents of the reactor is about 100,000 to 500,000 cP.

2. The process according to claim 1 wherein said $C_3$–$C_{10}$ α-olefin is a $C_4$–$C_{10}$ α-olefin.

3. The process according to claim 2 wherein said $C_3$–$C_{10}$ α-olefin is selected from the group consisting of hexene and octene.

4. The process according to claim 1 wherein said $C_3$–$C_{10}$ α-olefin is contacted with up to 10 wt. % of an additional α-olefin.

5. The process according to claim 1 wherein said unreactive hydrocarbon solvent is mineral spirits.

6. The process according to claim 1 wherein said catalyst is a Ziegler-Natta catalyst based on a titanium chloride.

7. The process according to claim 6 wherein said catalyst is selected from the group consisting of Ziegler-Natta catalysts based on $TiCl_3$ and Ziegler-Natta catalysts based on $MgCl_2$ supported $TiCl_4$.

8. The process according to claim 7 wherein said catalyst comprises:

(A) a solid catalyst component prepared by (a) reacting in an organic solvent a suspended magnesium compound with titanium tetrachloride in the presence of an organic acid chloride to form a solid substance containing an internal strong electron donor formed in situ, wherein said magnesium compound is of the formula $$MgQ_{2-n}X_n$$

wherein each Q is independently selected from the group consisting of an alkoxide, aryloxide, and carboxylate group, X is a halogen and n= 0 or 1, (b) decanting then washing said solid substance with an organic solvent that does not dissolve said solid substance, (c) contacting said solid substance suspended in an organic solvent, with titanium tetrachloride, and (d) decanting then washing said solid substance with an organic solvent that does not dissolve said solid substance;

(B) a silicon compound of the general formula;

$$SiR_m(OR')_{4-m}$$

wherein R is selected from the group consisting of an alkyl group, a cycloalkyl group, an aryl group and vinyl group, R' is an alkyl group and m is zero or an integer of 1–3, with the proviso that when m is 2 or 3, plural R groups may be identical or different, or that when m is zero, 1, or 2 plural R' groups may be identical or different and/or that when R is an alkyl group, R' may be identical with or different from R; and (C) an organoaluminum compound of the general formula;

$$R_P''AlX_{3-P}$$

wherein R" is an alkyl group, X is a halogen or hydrogen atom and P is an integer of 1–3, with the provision that when P is 2 or 3, plural R" groups may be identical or different.

9. The process according to claim 1 wherein said temperature is about 50° C. to 100° C.

10. The process according to claim 1 wherein said contacting for the majority of the contents of said reactor is for a time of about 0.5 to 10 hours.

11. The process according to claim 10 wherein said contacting is for about 3 to 5 hours.

12. The process according to claim 1 wherein a portion of said contents of said recirculated, stirred reactor is recirculated by being continually pumped out of said reactor at one point and pumped into said reactor at another point.

13. The process according to claim 12 wherein a portion of the contents of said reactor are continually removed by taking a slip stream off the contents being recirculated.

14. The process according to claim 12 wherein said contents of said reactor are recirculated such that 10 to 100 percent of the volume of said reactor is recirculated over a period of time of about 5 minutes to 2 hours.

15. The process according to claim 12 wherein said portion of said contents is recirculated by said high viscosity pump out of the bottom of said reactor into the top of said reactor.

16. The process according to claim 15 wherein said high viscosity pump is a gear pump.

17. The process according to claim 1 wherein said reactor is agitated by the use of a rotating stirrer having a central rotating shaft with paddles attached perpendicular to said shaft.

18. The process according to claim 1 wherein said $C_3$–$C_{10}$ α-olefin is octene, present in mineral spirits in a concentration of about 20 to 60 weight percent with about 0.009 to 0.02 weight percent catalyst.

19. The process according to claim 1 wherein said temperature is about 60° C. to 80° C.

* * * * *